United States Patent
Tinnin et al.

(10) Patent No.: US 8,641,094 B2
(45) Date of Patent: Feb. 4, 2014

(54) STEERING COLUMN TELESCOPE ADJUSTMENT STOP

(75) Inventors: Melvin Lee Tinnin, Clio, MI (US);
Kevin M Burns, Flushing, MI (US);
Michael Patrick Anspaugh, Bay City, MI (US); Matthew James-Thomas Vincent, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 334 days.

(21) Appl. No.: 12/952,943

(22) Filed: Nov. 23, 2010

(65) Prior Publication Data

US 2012/0126522 A1    May 24, 2012

(51) Int. Cl.
*B62D 1/185* (2006.01)

(52) U.S. Cl.
USPC .............................. 280/775; 280/777; 74/493

(58) Field of Classification Search
USPC ............................. 280/775, 777, 779; 74/493
See application file for complete search history.

(56) References Cited

U.S. PATENT DOCUMENTS

| | | | |
|---|---|---|---|
| 5,722,299 A * | 3/1998 | Yamamoto et al. | 74/493 |
| 5,857,703 A * | 1/1999 | Kinoshita et al. | 280/775 |
| 6,419,269 B1 * | 7/2002 | Manwaring et al. | 280/775 |
| 6,616,185 B2 * | 9/2003 | Manwaring et al. | 280/775 |
| 7,021,660 B2 * | 4/2006 | D'Agostino et al. | 280/775 |
| 7,267,025 B2 * | 9/2007 | Ko et al. | 74/493 |
| 7,415,908 B2 * | 8/2008 | Zernickel et al. | 74/493 |
| 8,047,096 B2 * | 11/2011 | Ridgway et al. | 74/493 |
| 2008/0196536 A1 * | 8/2008 | Manwaring et al. | 74/493 |
| 2008/0245176 A1 * | 10/2008 | Manwaring et al. | 74/493 |
| 2009/0229399 A1 * | 9/2009 | Ozsoylu et al. | 74/493 |
| 2011/0185839 A1 * | 8/2011 | Inoue | 74/493 |

* cited by examiner

*Primary Examiner* — James English
(74) *Attorney, Agent, or Firm* — Cantor Colburn LLP

(57) ABSTRACT

A steering column assembly includes a rake bracket and a lower jacket secured to the rake bracket. An upper jacket is slidably disposed in the lower jacket and a locking bolt is rotatably located at the lower jacket configured to allow the upper jacket allow the translate along a steering column axis relative to the lower jacket when the locking bolt is in an unlocked position. A bolt driver is located at the locking bolt and is configured to interrupt a load path through a column retainer between the lower jacket and the rake bracket when the locking bolt is in an unlocked position.

12 Claims, 5 Drawing Sheets

STEERING COLUMN TELESCOPE ADJUSTMENT STOP

FIELD OF THE INVENTION

The subject matter disclosed herein relates to steering columns for motor vehicles. More specifically, the subject disclosure relates to a stop mechanism for a telescope adjustment of a steering column.

BACKGROUND

Steering columns for motor vehicles are often provided with mechanisms for adjusting the steering column's position by an operator of the motor vehicle. Available adjustments typically include a tilt or rake adjustment in which an angular position of the steering column is changed relative to the operator, and a telescoping adjustment in which the steering column is extended toward the operator or compacted away from the operator. Telescope of the steering column is adjusted by releasing an adjustment lever from a secured position, which then allows for movement along an axis of the steering column of an upper jacket of the steering column relative to a lower jacket into which the upper jacket is located. Returning the adjustment lever to the secured position retains the upper jacket in a desired set position relative to the lower jacket.

In a vehicle impact situation, the steering column is configured to absorb energy of the impact to prevent or reduce injury to the operator due to impact with the steering wheel. A steering column typically has a crash release load requirement that dictates at which load the steering column should break loose from its constraints and collapse. Normally, the transition from a restrained steering column to a collapsing steering column is achieved via the breakage or bending of a release component of the steering column. The integrity of this release component, however, may be compromised by aggressive adjustment of the telescope of the steering column and slamming the steering column against the stops or limits of its telescope adjustment. Such a failure can result in the steering column being loose when the telescope adjustment lever is in a locked position, cause ratcheting noise during adjustment of the steering column, or allow greater than intended telescope adjustment of the steering column resulting in unintended collision of other components.

Accordingly, it is desirable to provide a mechanism to prevent such damage to the steering column during aggressive telescope adjustment.

SUMMARY OF THE INVENTION

In one exemplary embodiment of the present invention, a steering column assembly includes a rake bracket and a lower jacket secured to the rake bracket. An upper jacket is slidably disposed in the lower jacket and a locking bolt is rotatably located at the lower jacket configured to allow the upper jacket to translate along a steering column axis relative to the lower jacket when the locking bolt is in an unlocked position. A bolt driver is located at the locking bolt and is configured to interrupt a load path, through a column retainer, between the lower jacket and the rake bracket when the locking bolt is in an unlocked position.

In another exemplary embodiment of the present invention, a stop mechanism for a steering column includes a locking bolt rotatably located at a lower jacket of the steering column. The locking bolt is configured to allow an upper jacket to translate along a steering column axis relative to the lower jacket when the locking bolt is in an unlocked position. A bolt driver is located at the locking bolt and is configured to interrupt a load path through a column retainer between the lower jacket and a rake bracket of the steering column when the locking bolt is in the unlocked position.

In yet another exemplary embodiment of the present invention, a method of interrupting a load path in a steering column assembly during telescope adjustment of the steering column includes rotating a locking bolt from a locked position to an unlocked position, thereby enabling telescope adjustment of the steering column. A bolt driver is rotated via rotation of the locking bolt and the bolt driver is engaged with a rake bracket and/or lower jacket of the steering column thereby interrupting a load path through a column retainer between the rake bracket and the lower jacket.

The above features and advantages and other features and advantages of the present invention are readily apparent from the following detailed description of the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

Figure 1:
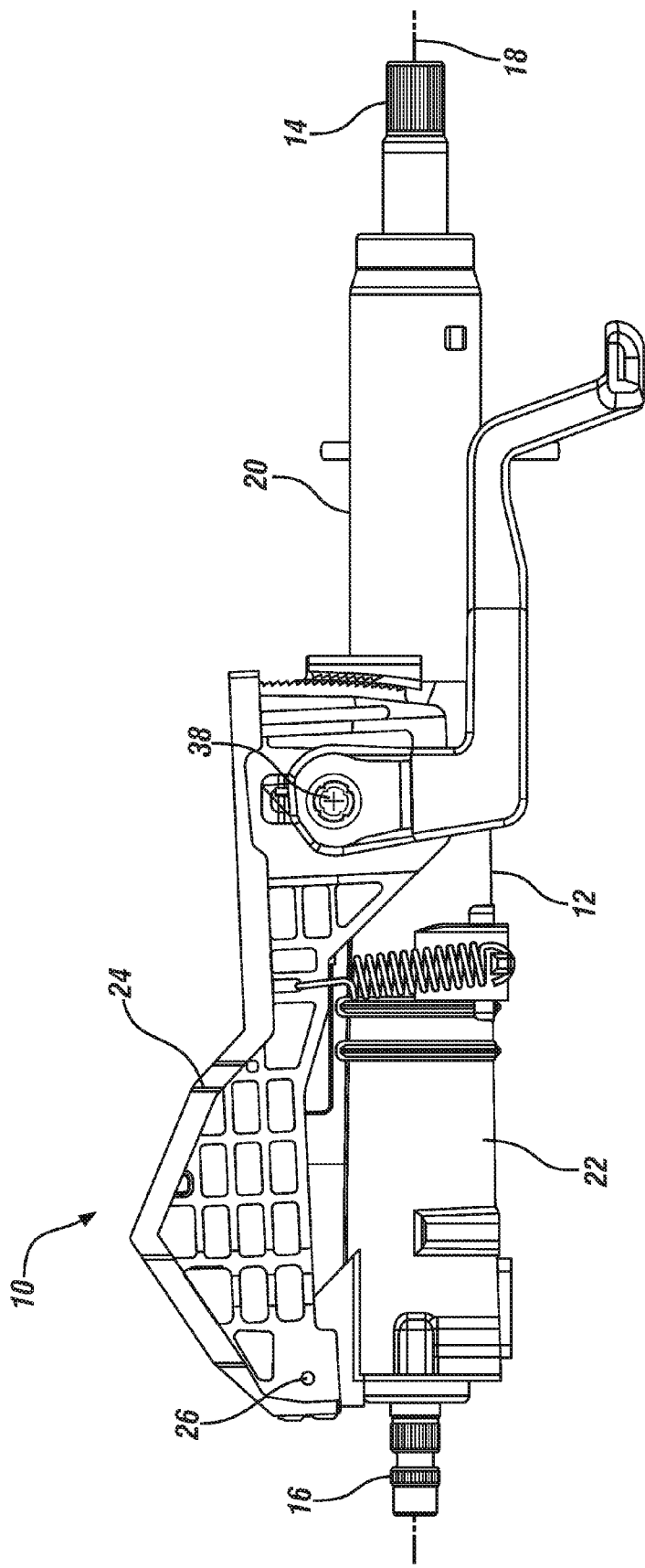
FIG. 1 is a schematic view of an embodiment of a steering column assembly.

In accordance with an exemplary embodiment of the present invention, shown in FIG. 1 is an embodiment of a steering column assembly 10 for a motor vehicle, which in some exemplary embodiments includes a telescoping adjustment. The steering column assembly 10 includes a column 12 having a first end 14 to which a steering wheel (not shown), or other operator control, is connectable, and a second end 16 which is operably connected to a steering system (not shown) that translates rotational motion of the column 12 about a column axis 18 into steering motion of the motor vehicle. In some embodiments, the column 12 includes an upper jacket 20 extending from the first end 14. The upper jacket 20 is at least partially located in a lower jacket 22 which extends from the second end 16 toward the first end 14. Motion of the upper jacket 20 in the lower jacket 22 along the column axis 18 is a telescopic adjustment of the steering column assembly 10. It is to be appreciated that while in the embodiment of FIG. 1, the upper jacket 20 is at least partially located in the lower jacket 22, in some embodiments, the configuration is substantially reversed, with the lower jacket 22 at least partially located inside the upper jacket 20. The lower jacket 22 is secured to a rake bracket 24 at a pivot 26.

Figure 2:
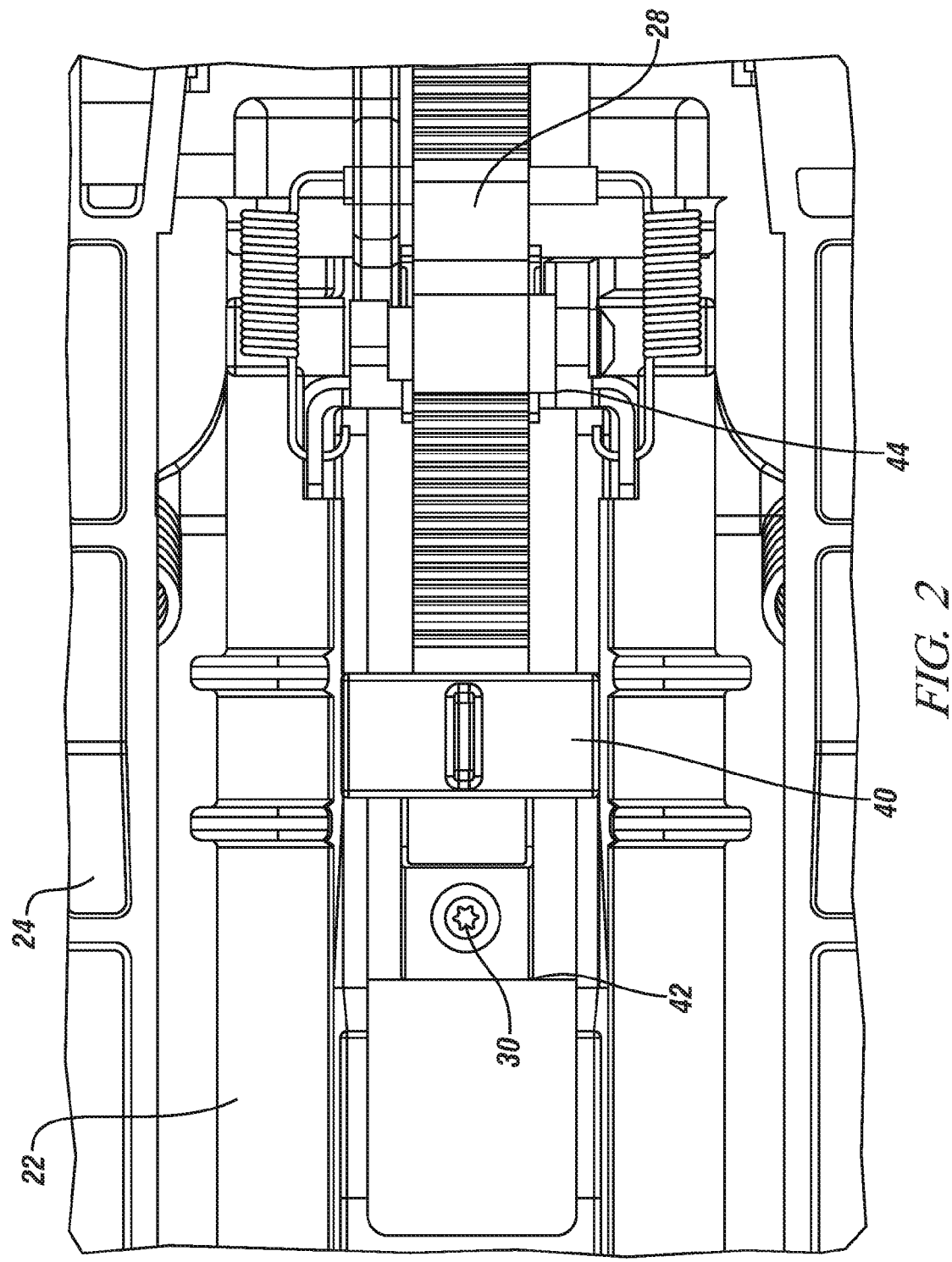
FIG. 2 is a schematic view of an embodiment of a telescope adjustment for a steering column assembly.

A telescope adjustment of the steering column assembly 10 is shown in FIG. 2. An energy absorbing (EA) strap 28 is secured to the upper jacket 20 via, for example, a strap retainer 30 which may be a screw or bolt or the like. A locking bolt 38 (shown in FIG. 1) extends through the lower jacket 22 and is interactive with the EA strap 28. When the locking bolt 38 is rotated to an unlocked position, the EA strap 28 and the upper jacket 20 are free to travel along the column axis 18. The EA strap 28 includes a bumper 40 which, in some embodiments, is substantially T-shaped. The bumper 40 allows the EA strap 28, and the upper jacket 20 to travel along the column axis 18 relative to the lower jacket 22 between a first travel stop 42 and a second travel stop 44.

Figure 3:
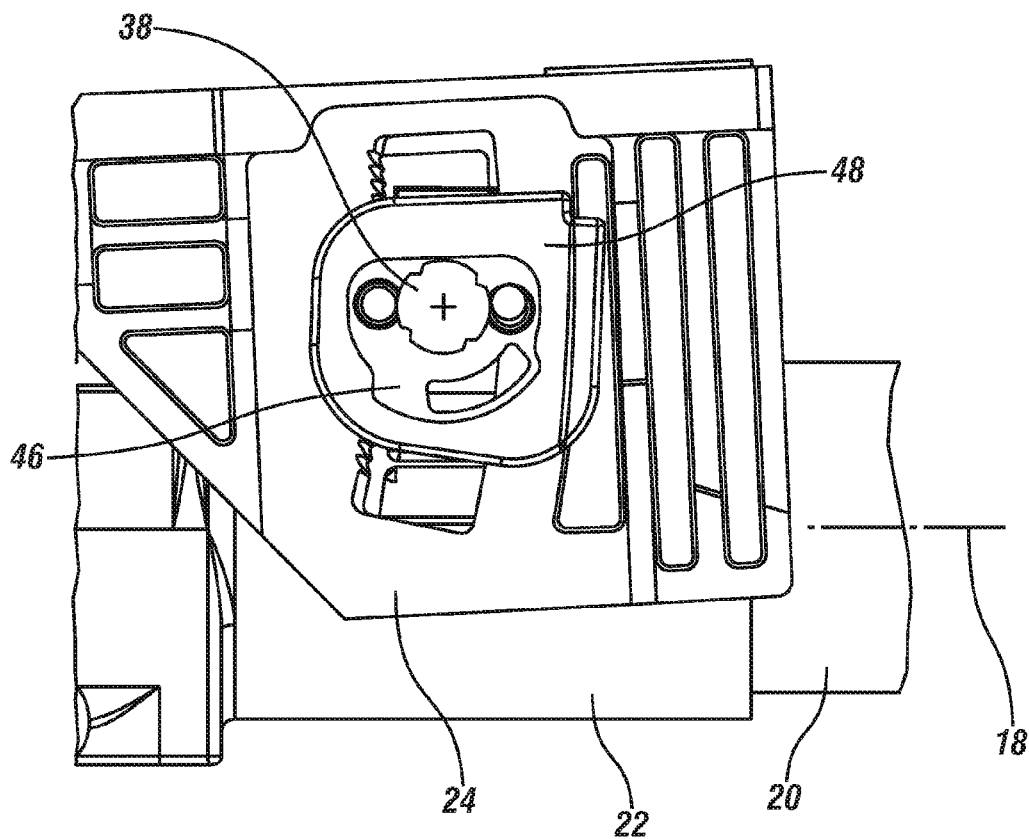
FIG. 3 is an embodiment of a column retainer for a steering column assembly.

Referring now to FIG. 3, the locking bolt 38 includes a cam-shaped bolt driver 46. The bolt driver 46 is interactive with a column retainer 48 located about the locking bolt 38 and the bolt driver 46. The column retainer 48 retains a position of the lower jacket 22 relative to the rake bracket 24. In the event of a load applied to the steering column 12 in excess of a crash release load, the column retainer 48 breaks, thereby allowing the lower jacket 22 to move along the column axis 18 relative to the rake bracket 24. If subjected to repetitive aggressive loading from telescope adjustment of the steering column 12, the column retainer 48 may become compromised or break prematurely.

Figure 4:
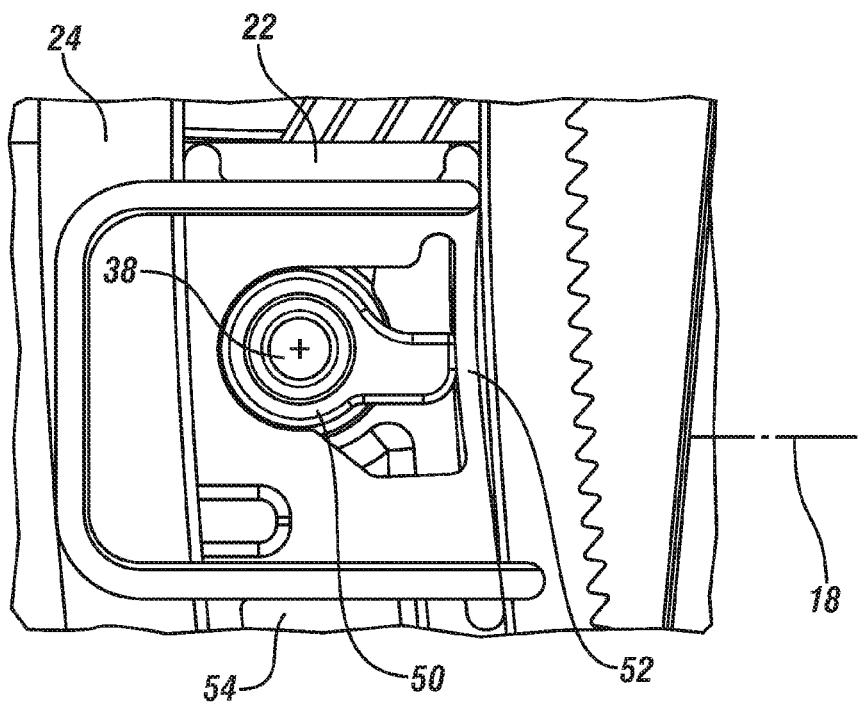
FIG. 4 is an embodiment of a telescope abuse stop for a steering column in an unlocked position.

Referring now to FIG. 4, the steering column assembly 10 includes a telescope abuse stop 50. The abuse stop 50 in this embodiment is a lobe of the bolt driver 46. The abuse stop 50 is configured to block movement of the lower jacket 22 relative to the rake bracket 24 when the locking bolt 38 is rotated to an unlocked position allowing telescope adjustment of the steering column assembly 10, as shown in FIG. 4. When the locking bolt 38 is rotated into the unlocked position, the abuse stop 50 rotates into a substantially appropriate contact condition with a lower jacket bracket 52 which is fixed to the lower jacket 22 and is located in a rake slot 54 of the rake bracket 24. In some embodiments, the lower jacket bracket 52 is located on an opposite side of the steering column assembly 10 from the column retainer 48. Rotation of the abuse stop 50 into contact with the lower jacket bracket 52 prevents movement of the locking bolt 38, and the lower jacket 22, relative to the rake bracket 24. Further, the abuse stop 50 blocks a load path to the column retainer 48, thus preventing damage thereto.

Figure 5:
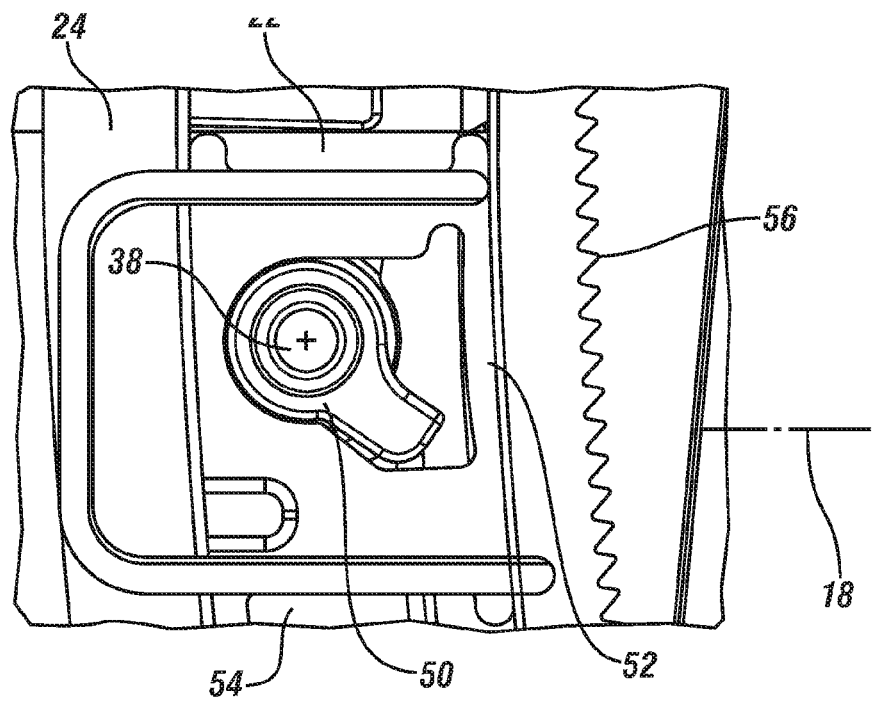
FIG. 5 is an embodiment of a telescope abuse stop for a steering column in a locked position.

As shown in FIG. 5, when the locking bolt 38 is rotated to a locked position, thus preventing telescope adjustment of the steering column assembly 10, the abuse stop 50 rotates out of contact with the lower jacket bracket 52. Thus the abuse stop 50 no longer blocks the load path and allows forces attempting to move the locking bolt 38 and the lower jacket 22 to act on the column retainer 48. With the locking bolt 38 in the locked position, when a load exceeding the crash release load is applied to the steering column 12, the column retainer 48 breaks, allowing the lower jacket 22 to move relative to the rake bracket 24 along the column axis 18 to engage positive rake lock features 56.

Figure 6:
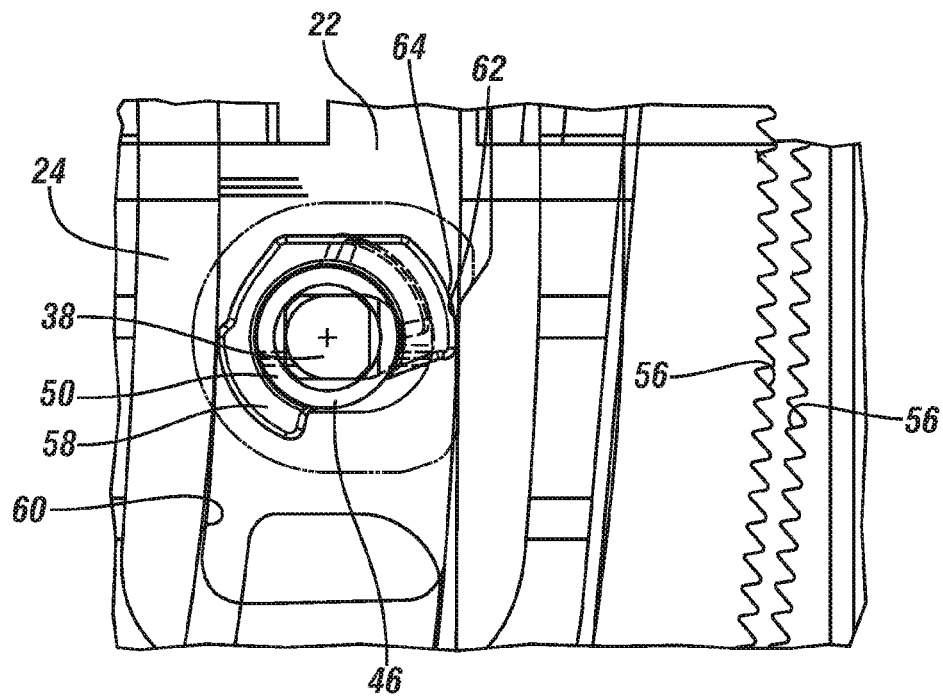
FIG. 6 is another embodiment of a telescope abuse stop for a steering column in an unlocked position.
Figure 7:
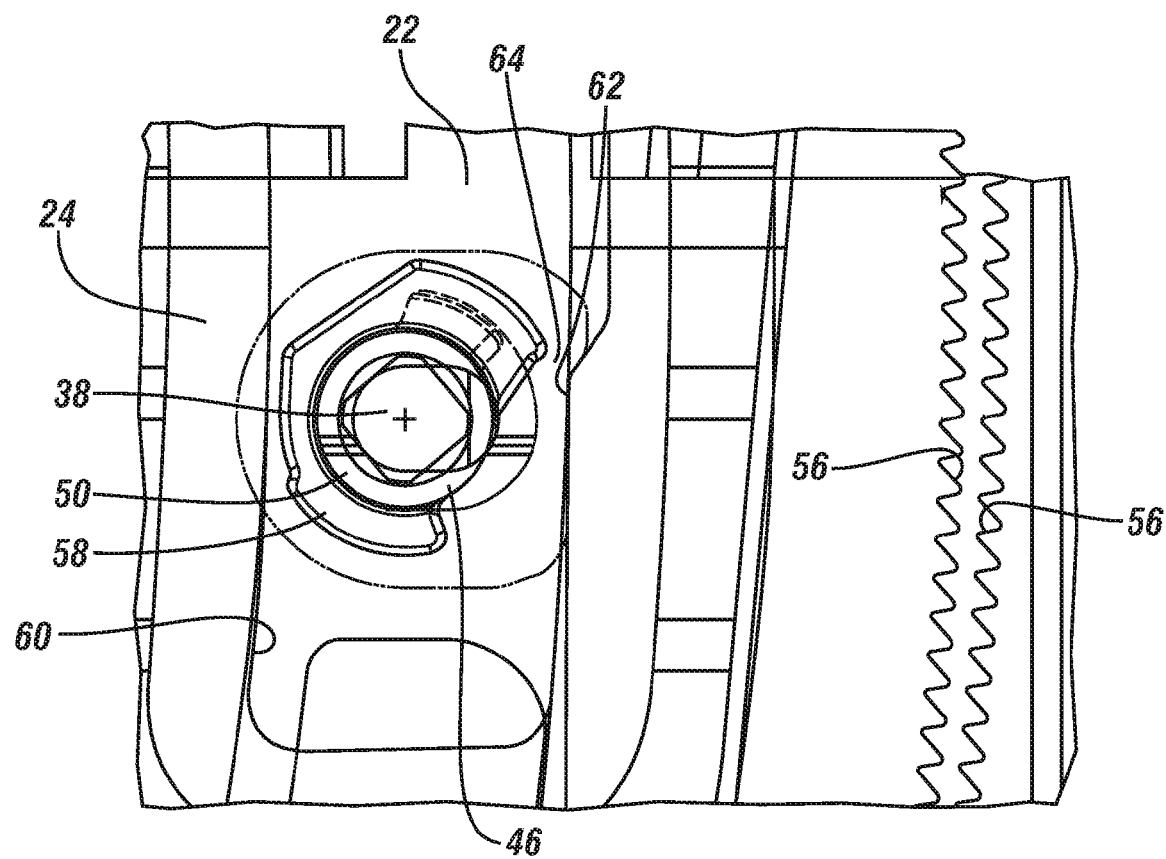
FIG. 7 is another embodiment of a telescope abuse stop for a steering column in a locked position.

Another embodiment of an abuse stop 50 is shown in FIG. 6. In the embodiment of FIG. 6, the abuse stop 50 is an eccentrically shaped end of the bolt driver 46. When the locking bolt 38 is rotated to the unlocked position, a first portion 58 of the abuse stop 50 engages a rake bracket slot wall 60 and a second portion 62 of the abuse stop 50 engages a lower jacket wall 64 to block movement of the lower jacket 22 relative to the rake bracket 24 along the column axis 18. Referring to FIG. 7, when the bolt driver 46 is rotated to the locked position, the first portion 58 and second portion 62 disengage from the rake bracket 24 and lower jacket 22, thus no longer blocking the load path and allowing forces attempting to move the locking bolt 38 and the lower jacket 22 to act on the column retainer 48. Blocking the load path when the locking bolt 38 is in an unlocked position prevents aggressive telescope adjustment of the steering column assembly 10 from compromising the structural integrity of the column retainer 48, thus preventing a loose feeling in the steering column assembly 10 when the locking bolt 38 is in the locked position.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed:

1. A steering column assembly comprising:
   a rake bracket;
   a lower jacket secured to the rake bracket;
   an upper jacket slidably disposed in the lower jacket;
   a locking bolt rotatably disposed at the lower jacket configured to allow the upper jacket to translate along a steering column axis relative to the lower jacket when the locking bolt is in an unlocked position; and
   a bolt driver disposed at the locking bolt and configured to interrupt a load path through a column retainer between the lower jacket and the rake bracket when the locking bolt is in the unlocked position, the bolt driver including:
   a first portion in contact with the rake bracket when the locking bolt is in an unlocked position; and
   a second portion in contact with the lower jacket when the locking bolt is in an unlocked position;
   wherein the contact interrupts the load path.

2. The steering column assembly of claim 1, wherein the column retainer is disposed at a rake bracket slot, the bolt driver interactive with a lower jacket bracket to interrupt the load path through the column retainer.

3. The steering column assembly of claim 2, wherein the bolt driver includes a lobe in contact with the column retainer when the locking bolt is in the unlocked position.

4. The steering column assembly of claim 3, wherein the contact interrupts the load path.

5. The steering column assembly of claim 2, wherein the column retainer is breakable at a crash release load.

6. The steering column assembly of claim 1, wherein the bolt driver is substantially cam shaped.

7. A stop mechanism for a steering column comprising:
   a locking bolt rotatably disposed at a lower jacket of the steering column configured to allow an upper jacket to translate along a steering column axis relative to the lower jacket when the locking bolt is in an unlocked position; and
   a bolt driver disposed at the locking bolt and configured to interrupt a load path through a column retainer between the lower jacket and a rake bracket of the steering column when the locking bolt is in the unlocked position, the bolt driver including:
   a first portion in contact with the rake bracket when the locking bolt is in an unlocked position; and
   a second portion in contact with the lower jacket when the locking bolt is in an unlocked position;
   wherein the contact interrupts the load path through the column retainer.

8. The stop mechanism of claim 7, wherein the bolt driver is substantially cam shaped.

9. The stop mechanism of claim 7, wherein the column retainer is disposed at a rake bracket slot, the bolt driver interactive with a lower jacket bracket to interrupt the load path through the column retainer.

10. The stop mechanism of claim 9, wherein the bolt driver includes a lobe in contact with the column retainer when the locking bolt is in the unlocked position.

11. The stop mechanism of claim 10, wherein the contact interrupts the load path.

12. The stop mechanism of claim 9, wherein the column retainer is breakable at a crash release load.

\* \* \* \* \*